United States Patent [19]

Volkert

[11] Patent Number: 5,096,933

[45] Date of Patent: Mar. 17, 1992

[54] PROCESS FOR THE PREPARATION OF POLYURETHANE RIGID FOAMS HAVING A LOW THERMAL CONDUCTIVITY AND THEIR USE

[76] Inventor: Otto Volkert, IM Eiertal 10, 6719 Weisenheim, Fed. Rep. of Germany

[21] Appl. No.: 577,174

[22] Filed: Sep. 4, 1990

[30] Foreign Application Priority Data

Oct. 6, 1989 [DE] Fed. Rep. of Germany ....... 3933335

[51] Int. Cl.$^5$ .......................... C08K 5/00; C11D 7/30; C08G 18/14
[52] U.S. Cl. ..................................... 521/131; 521/98; 521/99; 521/114; 521/115; 521/137; 521/160; 521/172
[58] Field of Search ................ 521/131, 115, 116, 133, 521/98, 172, 99, 160, 114, 137; 428/318.4

[56] References Cited

U.S. PATENT DOCUMENTS

| | | | |
|---|---|---|---|
| 3,586,651 | 6/1971 | Salyer et al. | 521/113 |
| 4,555,442 | 11/1985 | Frentzel | 521/116 |
| 4,572,919 | 2/1986 | Londrigan | 521/137 |
| 4,996,242 | 2/1991 | Lin | 521/131 |
| 4,997,589 | 3/1991 | Lund et al. | 521/131 |

FOREIGN PATENT DOCUMENTS

| | | |
|---|---|---|
| 2544560 | 4/1977 | European Pat. Off. |
| 0389011 | 9/1990 | European Pat. Off. |
| 0405439 | 1/1991 | European Pat. Off. |

*Primary Examiner*—John Kight, III
*Assistant Examiner*—Duc Truong

[57] ABSTRACT

The present invention relates to a process for the preparation of polyurethane rigid foams having a low thermal conductivity, comprising reacting:

a) organic and/or modified organic polyisocyanates with, b) at least one higher molecular weight compound having at least two reactive hydrogen atoms, and optionally c) lower molecular weight chain extending agents and/or crosslinking agents in the presence of, d) cyclopentane (d1) or mixtures (d2) comprising, d2i) cyclopentane, and/or cyclohexane, d2ii) at least one compound homogeneously miscible with cyclopentane and/or cyclohexane, said compound preferably has a boiling point below 35° C. and is selected from the group consisting of alkanes, cycloalkanes having a maximum of 4 carbon atoms, dialkylethers, cycloalkylene ethers and fluoroalkanes, optionally combined with water as said blowing agent (d), e) catalysts, and optionally f) auxiliaries and/or additives.

Polyurethane rigid foams are used in the low temperature appliance industry and as insulating materials in heating and composite elements.

32 Claims, No Drawings

PROCESS FOR THE PREPARATION OF POLYURETHANE RIGID FOAMS HAVING A LOW THERMAL CONDUCTIVITY AND THEIR USE

BACKGROUND OF THE INVENTION 1. Field of the Invention

The present invention deals with a process for the preparation of polyurethane (henceforth abbreviated PU) rigid foams from conventional starting components in the presence of cyclopentane or mixtures of cyclopentane and/or cyclohexane and at least one compound homogeneously miscible with cyclopentane and/or cyclohexane having a boiling point below 35° C. selected from the group consisting of alkanes, cycloalkanes having a maximum of 4 carbon atoms, dialkylethers, cycloalkylene ethers and fluoroalkanes, as well as additionally water as a blowing agent. The present invention also deals with using the PU rigid foams for foaming the hollow areas in low temperature housing compartments or in heating elements as well as using these PU rigid foams as insulating material for composite elements.

2. Description of the Related Art

The preparation of composite or sandwich elements made from a PU rigid foam and at least one top layer of a rigid or elastic material such as, for example, paper, plastic films, metal sheets, glass non-wovens, backing panels, etc. is well known. Also known is foaming the hollow spaces in household appliances such as, for example, low temperature housing compartments, that is, refrigerators or freezer chests or hot water tanks using PU rigid foam as a heat insulating material. In order to avoid cavities the foamable PU reaction mixture must be injected into the hollow space which is to be insulated within a short time. To foam such household appliances, typically low pressure machines, but preferably high pressure machines are used.

Typical insulating PU rigid foams can be prepared conventionally by reacting organic polyisocyanates with one or more higher molecular weight compounds having at least two reactive hydrogen atoms, preferably polyester polyols and/or polyether polyols as well as typically while using lower molecular weight chain extending agents and/or crosslinking agents in the presence of blowing agents, catalysts and optionally auxiliaries and/or additives. By properly selecting the starting components one can obtain PU rigid foam having a very low coefficient of thermal conductivity and good mechanical properties.

A comprehensive overview concerning the preparation of PU rigid foams and their use as covering layers or preferably core layers in the composite elements as well as their use as insulation layers in low temperature or heating technology has been published for example in Polyurethanes, Plastics Handbook, Vol. 7, 1st Ed. 1966, edited by Dr. R. Vieweg and Dr. A. Hoechtlen and in the 2nd Edition of 1983 edited by Dr. Gunther Voertel, Carl-Hanser Verlag, Munich and Vienna.

Chlorofluoroalkanes, preferably trichlorofluoromethane, are used worldwide on a large scale as blowing agents in the preparation of insulating PU rigid foams. A disadvantage of these propellant gases is an environmental burden since they are suspected of contributing to the degradation of the ozone layer in the stratosphere.

Along with the aforesaid trichlorofluoromethane, other physically effective blowing agents are also used in the preparation of PU rigid foams. One example is found in DC-C-1 045 644 (U.S. Pat. No. 3,391,093) which discloses gaseous hydrocarbons having not more than 3 carbon atoms such as methane, ethane, ethylene, propane and propylene and halogenated hydrocarbons such as, for example, chloromethane, dichlorodifluoromethane, dichlorofluoromethane, chlorodifluoromethane, chloroethane and dichlorotetrafluoroethane as well as, octafluorocyclobutane, and hexafluorocyclobutane and hexafluoropropane. Another example is found in Belgium patent 596,608 which discloses halogen alkanes, such as for example, 1,1-difluoro-2,2-dichloroethane, 1,2-difluoro-1,2-dichloroethane, 1,1-dichloroethane, 1-fluoro-1,2-dichloroethane, 1-fluoro-2,2-dichloroethane, 1,2-dichloroethane, trichloroethane, tetrachloroethane, 1-fluoro-1,2,2-trichloroethane, 1-bromoethane, and 1,1,2-trifluoro-2-chloroethane. Another example is found in PCT Application WO 89/00594 which discloses 1,1,1-trichloroethane which is used when mixed with other blowing agents.

The aforesaid blowing agents have somewhat of a disadvantage in that they are toxic, or compared to trichlorofluoromethane they possess a lower gas yield when blowing PU foam because of their boiling point, or they make the PU rigid foam have a lower insulating effect, and/or they cause the foam to shrink. Additionally they lead to the formation of voids in the foams core or to the partial collapse of the foam even during the foaming process itself.

Especially the saturated and unsaturated hydrocarbons, specifically n-pentane, suitable for foaming polystyrene, possess thermal conductivities which are too high to generate PU rigid foams having the required insulating properties. Thus, for example, the thermal conductivity of n-pentane is $150 \cdot 10^{-4}$ W/m·°K. and that of n-butane at 25° C. is even $163 \cdot 10^{-4}$ W/m·°K.

Another blowing agent is carbon dioxide which according to GD-A 21 16 574 can be dissolved under pressure in at least one starting component for the preparation of PU rigid foam; said carbon dioxide can be thermally cleaved from salts such as, for example, carbamates; carbonates such as, for example, ammonium carbonate, or from bicarbonates, or can be formed from the reaction of isocyanate with water to form urea groups. Along with the established industrial processing difficulties when using solid carbon dioxide or gaseous carbon dioxide under pressure, this method of preparing PU rigid foams has a significant disadvantage in that the carbon dioxide, due its very high diffusion rate, diffuses very quickly through the matrix of the PU foam. In addition, at 25° C. carbon dioxide has a thermal conductivity of $164 \cdot 10^{-4}$ W/m·°K.; this value lies at the level of that of n-butane and is 85% poorer than the formally used trichlorofluoromethane.

OBJECTS OF THE INVENTION

The object of the present invention was to prepare polyurethane rigid foams having a low thermal conductivity, whereby the aforesaid disadvantages especially with respect to environmental damage and toxicity of the blowing agent, for example, in the preparation of PU rigid foam would hopefully be completely eliminated or at least substantially overcome. The PU rigid foams should be suitable especially for foaming hollow spaces in low temperature compartment housings and in hot water storage vessels as well as suitable for an intermediate layer in composite elements.

This object was surprisingly met by using cyclopentane or mixtures of cyclopentane or cyclohexane and other low boiling point compounds homogeneously miscible with the aforesaid cycloalkanes as blowing agents, optionally in conjunction with water.

Description of the Preferred Embodiments

Accordingly, the subject invention pertains to a process for the preparation of polyurethane rigid foams having a low thermal conductivity, comprising reacting:

a) organic and/or modified organic polyisocyanates with, b) at least one higher molecular weight compound having at least two reactive hydrogen atoms, and optionally c) lower molecular weight chain extending agents and/or crosslinking agents, in the presence of d) blowing agents, e) catalysts, and optionally f) auxiliaries and/or additives, wherein d1) cyclopentane, or d2) mixtures containing or preferably comprising, d2i) cyclopentane, cyclohexane or a mixture of these cycloalkanes, and d2ii) at least one low boiling point compound homogeneously miscible with cyclopentane and/or cyclohexane preferably having a boiling point below 35° C., are used as said blowing agent d).

The subject invention further pertains to special embodiments of the subject process and to using the PU rigid foams prepared according to the present invention as an intermediate layer for composite elements and for foaming the hollow cavities, preferably in low temperature compartment housings or in heating elements.

PU rigid foams having a very low thermal conductivity are obtained by using cyclopentane or mixtures of cyclopentane, cyclohexane or a mixture of these cycloalkanes and other low boiling point blowing agents which are used in small quantities to reduce the boiling point of the blowing agent mixture. Another advantage is that the cycloalkanes used according to the present invention have a low coefficient of thermal conductivity of about $105 \cdot 10^{-4}$ W/m·°K. compared to organic compounds having a comparable molecular weight. Moreover, their solubility in the PU matrix is very small so that the permeation rates are extremely small from the PU rigid foams prepared. Also worth pointing out is the good compatibility of the PU rigid foam with plastic materials, especially toughened polystyrene, which are typically used as covering materials in low temperature appliances. Since these plastics are very resistant against cycloalkanes, stress cracking corrosion on the plastic covering layer can be practically eliminated.

Since the PU rigid foams prepared according to the present invention are further processed preferably having a covering layer, or the formulations serve to form hollow compartments, the disadvantage caused by the flammability of the cycloalkanes is predominantly eliminated and accordingly is negligible.

As already indicated, conventional starting components, except for the blowing agent are used in the preparation of the PU rigid foams according to the present invention and the following should be noted with respect to the conventional starting components.

a) The organic polyisocyanates include all essentially known aliphatic, cycloaliphatic, araliphatic and preferably aromatic multivalent isocyanates.

Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'-, 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures, 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates, mixtures of 4,4'-, 2,4'-, and 2,2'-diphenylmethane diisocyanates and polyphenylenepolymethylene polyisocyanates, (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates, are used. Examples include diisocyanates and/or polyisocyanates containing ester groups, urea groups, biuret groups, allophanate groups, carbodiimide groups, isocyanurate groups and/or urethane groups. Specific examples include organic, preferably aromatic, polyisocyanates containing urethane groups and having a NCO content of 33.6 to 15 weight percent, preferably 31 to 21 weight percent, based on the total weight, e.g., with low molecular weight diols, triols, dialkylene glycols, trialkylene glycols or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol and polyoxypropylene polyoxyethylene glycols or -triols. Prepolymers containing NCO groups with a NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4- and/or 2,6-toluene diisocyanates or polymeric MDI are also suitable. Furthermore, liquid polyisocyanates containing carbodiimide groups and/or isocyanurate rings and having a NCO content of 33.6 to 15 weight percent, preferably 31 to 21 weight percent, based on the total weight, have also proved suitable, e.g., based on 4,4'- and 2,4'- and/or 2,2'-diphenylmethane diisocyanate and/or 2,4- and/or 2,6-toluene diisocyanate.

The modified polyisocyanates may optionally be mixed together or mixed with unmodified organic polyisocyanates such as 2,4'- and 4,4'-diphenylmethane diisocyanate, polymeric MDI, 2,4- and/or 2,6-toluene diisocyanate.

The following have proven especially successful as organic polyisocyanates and are preferred for use in the preparation of polyurethane rigid foams: mixtures of toluene diisocyanates, and polymeric MDI, or mixtures of modified urethane groups containing organic polyisocyanates having a NCO content of from 33.6 to 15 weight percent most preferably, based on toluene diisocyanates, 4,4'-diphenylmethane diisocyanate, diphenylmethane diisocyanate isomeric mixtures or polymeric MDI and most preferably, polymeric MDI having a diphenylmethane diisocyanate isomeric content of from 30 to 80 weight percent, more preferably from 30 to 55 weight percent.

b) Preferably, polyhydroxyl compounds having a functionality of 2 to 8, more preferably 3 to 8, and a hydroxyl number of 150 to 850, more preferably 350 to 800 are examples of higher molecular weight compounds (b) having at least 2 reactive hydrogen atoms.

For example, polythioether polyols, polyester amides, polyacetals containing hydroxyl groups, aliphatic polycarbonates containing hydroxyl groups, and preferably, polyester polyols and polyether polyols. In addition, mixtures of at least two of the aforesaid polyhydroxyl compounds can be used as long as these have an average hydroxyl number in the aforesaid range.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used individually or in mixtures. Instead of the free dicarboxylic acids, the corresponding dicarboxylic acid derivatives may also be used such as dicarboxylic acid mono- or di- esters of alcohols with 1 to 4 carbons, or dicarboxylic acid anhydrides. Dicarboxylic acid mixtures of succinic acid, glutaric acid and adipic acid in quantity ratios of 20-35:-35-50:20-32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropane. Ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol and 1,6-hexanediol. Furthermore, polyester polyols of lactones, e.g., $\epsilon$-caprolactone or hydroxycarboxylic acids, e.g., $\omega$-hydroxycaproic acid, may also be used.

The polyester polyols can be produced by polycondensation of organic polycarboxylic acids, e.g., aromatic or preferably aliphatic polycarboxylic acids and-/or derivatives thereof and multivalent alcohols in the absence of catalysts or preferably in the presence of esterification catalysts, preferably in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value, which is preferably less than 10, especially less than 2. In a preferred embodiment, the esterification mixture is subjected to polycondensation at the temperatures mentioned above up to an acid value of 80 to 30, preferably 40 to 30, under normal pressure and then under a pressure of less than 500 mbar, preferably 50 to 150 mbar. Examples of suitable esterification catalysts include iron, cadmium, cobalt, lead, zinc, antimony, magnesium, titanium and tin catalysts in the form of metals, metal oxides or metal salts. However, the polycondensation may also be performed in liquid phase in the presence of diluents and-/or entraining agents such as benzene, toluene, xylene or chlorobenzene for azeotropic distillation of the water of condensation.

To produce the polyester polyols, the organic polycarboxylic acids and/or derivatives thereof and multivalent alcohols are preferably polycondensed in a mole ratio of 1:1–1.8, preferably 1:1.05–1.2.

The resulting polyester polyols preferably have a functionality of 2 to 3, and a hydroxyl number of 150 to 400, and especially 200 to 300.

However, polyether polyols, which can be obtained by known methods, are especially preferred for use as the polyhydroxyl compounds. For example, polyether polyols can be produced by anionic polymerization with alkali hydroxides such as sodium hydroxide or potassium hydroxide or alkali alcoholates, such as sodium methylate, sodium ethylate or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical.

Suitable cyclic ethers and alkylene oxides include, for example, tetrahydrofuran, 1,3-propylene oxide, 1,2- and 2,3-butylene oxide, styrene oxide and preferably ethylene oxide and 1,2-propylene oxide. The alkylene cyclic ethers and oxides may be used individually, in alternation, one after the other or as a mixture. Examples of suitable initiator molecules include water, organic dicarboxylic acids such as succinic acid, adipic acid, phthalic acid and terephthalic acid, aliphatic and aromatic, optionally N-mono-, N,N-, and N,N'-dialkyl substituted diamines with 1 to 4 carbons in the alkyl radical, such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-toluenediamine and 4,4'-, 2,4'- and 2,2'-diaminodiphenylmethane.

Suitable initiator molecules also include alkanolamines such as ethanolamine, diethanolamine, N-methyl- and N-ethylethanolamine, N-methyl- and N-ethyldiethanolamine and triethanolamine plus ammonia.

Multivalent alcohols, especially divalent and/or trivalent alcohols are preferred such as ethanediol, 1,2-propanediol and 1,3-propanediol, diethylene glycol, dipropylene glycol, 1,4-butanediol, 1,6-hexanediol, glycerine, trimethylolpropane, pentaerythritol, sorbitol and sucrose.

The polyether polyols have a functionality of preferably 3 to 8 and especially 3 to 6 and have a hydroxyl number of 300 to 850, preferably 350 to 800.

Also suitable as polyether polyols are: melamine polyether polyol dispersions according to EP A 23 987 (U.S. Pat. No. 4,293,657); polymer polyether polyol dispersions prepared from polyepoxides and epoxide resin hardeners in the presence of polyether polyols according to DE 29 43 689 (U.S. Pat. No. 4,305,861); dispersions of aromatic polyesters in polyhydroxyl compounds according to EP A 62 204 (U.S. Pat. No. 4,435,537) or according to DE A 33 00 474; dispersions of organic and/or inorganic fillers in polyhydroxyl compounds according to EP A 11 751 (U.S. Pat. No. 4,243,755); polyurea polyether polyol dispersions according to DE A 31 25 402; tris-(hydroxyalkyl)-isocyanurate polyether polyol dispersions according to EP A 136 571 (U.S. Pat. No. 4,514,526) and crystallite suspensions according to DE A 33 42 176 and DE A 33 42 177 (U.S. Pat. No. 4,560,708), whereby the details in the aforesaid patents are to be regarded as a part of the patent disclosure, and are herein incorporated by reference.

Like the polyester polyols, the polyether polyols may be used either individually or in the form of mixtures. Furthermore, they can be mixed with the aforesaid dispersions, suspensions, or polyester polyols as well as the polyester amides containing hydroxyl groups, the polyacetals, and/or polycarbonates.

Examples of hydroxyl group-containing polyacetals that can be used include, for example, the compounds that can be produced from glycols such as diethylene glycol, triethylene glycol, 4,4'-dihydroxyethoxydiphenyldimethylmethane, hexanediol and formaldehyde. Suitable polyacetals can also be produced by polymerization of cyclic acetals.

Suitable hydroxyl group-containing polycarbonates include those of the known type such as those obtained by reaction of diols, e.g., 1,3-propanediol, 1,4-butanediol and/or 1,6-hexanediol, diethylene glycol, triethylene glycol or tetraethylene glycol and diaryl carbonates, e.g., diphenyl carbonate, or phosgene.

The polyester amides include the mainly linear condensates obtained from multivalent saturated and/or unsaturated carboxylic acids and their anhydrides and amino alcohols, or mixtures of multivalent alcohols and amino alcohols and/or polyamines.

Mixtures which have proven most preferred as polyhydroxyl compounds and which are thus preferably used are those which, based on 100 parts by weight, comprise:

bi) up to 95 parts by weight, more preferably 20 to 80 parts by weight of a polyether polyol initiated with sucrose having a hydroxyl number of from 300 to 500, more preferably 350 to 450, based on 1,2-propylene oxide or 1,2-propylene oxide and ethylene oxide;

bii) up to 15 parts by weight, more preferably 5 to 15 parts by weight of a polyether polyol initiated with sorbitol having a hydroxyl number of from 400 to 600, more preferably 450 to 550, based on 1,2-propylene oxide or 1,2-propylene oxide and ethylene oxide;

biii) up to 20 parts by weight, more preferably 5 to 15 parts by weight of a polyether polyol initiated with ethylenediamine having a hydroxyl number of from 700 to 850, more preferably 750 to 800, based on 1,2-propylene oxide; and biv) up to 60 parts by weight, more preferably 5 to 40 parts by weight of a polyether polyol having a hydroxyl number of from 400 to 600, more preferably 450 to 550, based on 1,2-propylene oxide or 1,2-propylene oxide and ethylene oxide prepared while using a mixture of sucrose and triethanolamine in a weight ratio of from 1:2 to 2:1 as an initiator molecule.

c) The polyurethane rigid foams can be prepared with or without using chain extending agents and/or crosslinking agents. To modify the mechanical properties, however, it has proven advantageous to add chain extenders, crosslinking agents or optionally mixtures thereof. Suitable chain extenders and/or crosslinking agents include preferably alkanolamines, more preferably diols and/or triols with molecular weights of less than 400, preferably 60 to 300. Typical examples are alkanolamines such as, for example, ethanolamine and/or isopropanolamine; dialkanolamines, such as, for example, diethanolamine, N-methyl-, N-ethyldiethanolamine, diisopropanolamine; trialkanolamines such as, for example, triethanolamine, triisopropanolamine; and the addition products from ethylene oxide or 1,2-propylene oxide, and alkylenediamines having 2 to 6 carbon atoms in the alkylene radical such as, for example, N,N'-tetra(2-hydroxyethyl)-ethylenediamine and N,N'-tetra(2-hydroxypropyl)ethylenediamine, aliphatic, cycloaliphatic and/or araliphatic diols having 2 to 14, more preferably 4 to 10 carbon atoms such as, for example, ethylene glycol, 1,3-propanediol, 1,10-decanediol, o-, m-, p-dihydroxycyclohexane, diethylene glycol, dipropylene glycol, and preferably 1,4-butanediol, 1,6-hexanediol, and bis-(2-hydroxyethyl)-hydroquinone; triols such as 1,2,4-, and 1,3,5-trihydroxycyclohexane, glycerine and trimethylolpropane; and lower molecular weight hydroxyl group containing polyalkylene oxides, based on ethylene oxide and/or 1,2-propylene oxide and aromatic diamines such as, for example, toluene diamines and/or diaminodiphenylmethanes as well as the aforesaid alkanolamines, diols, and/or triols as initiator molecules.

If chain extending agents, crosslinking agents, or mixtures thereof are used in the preparation of polyurethane rigid foams, then advantageously these are used in a quantity of from up to 20 weight percent, more preferably 2 to 5 weight percent, based on the weight of the polyhydroxyl compound.

d) Preferably cyclopentane (d1) is used as a blowing agent in the preparation of the PU rigid foam. However, mixtures (d2) comprising:

d2i) cyclopentane, cyclohexane or a mixture of the aforesaid cycloalkanes, and d2ii) at least one low boiling point compound homogeneously miscible with cyclopentane and/or cyclohexane, preferably a compound having a boiling point below 35° C.

have proven very effective as well.

Suitable compounds of the aforesaid type used as blowing agents can be selected from the group consisting of alkanes, cycloalkanes having a maximum of 4 carbon atoms, dialkylethers, cycloalkylene ethers and fluoroalkanes. Mixtures of at least two compounds from the aforesaid group can also be used. Individual examples are: alkanes, such as, for example, propane and butane or isobutane; cycloalkanes such as, for example, cyclobutane; dialkylethers, such as, for example, dimethylether, methylethylether or diethylether; cycloalkylene ethers such as, for example, furan and fluoroalkanes which break down in the troposphere and thus do not damage the ozone layer, such as, for example, trifluoromethane, difluoromethane, difluoroethane, tetrafluoroethane and heptafluoropropane.

The blowing agents used according to the present invention can be used alone or preferably in conjunction with water, whereby the following combinations are preferred and thus they are efficaciously used: water and cyclopentane; water, cyclopentane, cyclohexane or a mixture of these cycloalkanes and at least one compound selected from the group consisting of n-butane, isobutane, cyclobutane, dimethylether, diethylether, furan, trifluoromethane, difluoromethane, difluoroethane, tetrafluoroethane and heptafluoropropane. The quantity of low boiling point compounds homogeneously miscible with cyclopentane and/or cyclohexane used in combination with cyclopentane and most preferably with cyclohexane, is measured so that the resulting mixture has a boiling point below 50° C., more preferably 30° C. to 0° C. The required quantity for this depends on the plot of the boiling point curve of the mixture and can be experimentally determined according to known methods. PU rigid foams having a low conductivity are especially obtained if the following is used as the blowing agent (d) per 100 parts by weight of starting component (b):

d1) 3 to 22 parts by weight, more preferably 5 to 18 parts by weight and most preferably 8 to 14 parts by weight of cyclopentane and 0 to 7 parts by weight, more preferably 2.0 to 5.0 parts by weight and most preferably 2.2 to 4.5 parts by weight of water or, d2i) 2 to 22 parts by weight, more preferably 5 to 19 parts by weight and most preferably 9 to 19 parts by weight cyclopentane and/or cyclohexane, and d2ii) 0.1 to 18 parts by weight, more preferably 0.5 to 10 parts by weight and most preferably 1.0 to 6.0 parts by weight of at least one compound having a boiling point below 35° C. homogeneous miscible with cyclopentane and/or cyclohexane, said compound is selected from the group consisting of alkanes, cycloalkanes having a maximum of 4 carbon atoms, dialkyl ethers, cycloalkylene ethers and preferably fluoroalkanes and 0 to 7 parts by weight, more preferably 2.0 to 5.0 parts by weight and most preferably 2.2 to 4.5 parts by weight of water.

When preparing the preparing the PU rigid foam the cyclopentane (d1) or the blowing agent mixture (d2) optionally combined with water is incorporated following conventional methods into at least one of starting components (a) through (c) for preparing the PU rigid foam optionally under pressure, or it is directly added to the reaction mixture typically by means of a suitable mixing device.

e) Suitable catalysts (e) include especially compounds that greatly accelerate the reaction of the hydroxyl group containing compounds of components (b) and optionally (c) with the polyisocyanates. Examples include organic metal compounds, preferably organic tin compounds such as tin(II) salts of organic carboxylic acids, e.g., tin(II) acetate, tin(II) dioctoate, tin(II) ethylhexoate and tin(II) laurate, as well as the dialkyltin(IV) salts of organic carboxylic acids, e.g., dibutyltin diacetate, dibutyltin dilaurate, dibutyltin maleate, and dioctyltin diacetate. The organic metal compounds are used alone or preferably in combination with strong basic amines. Examples include amines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethyl-butanediamine, or -hexanediamine, pentamethyldiethylenetriamine, tetramethyldiaminoethyl ether, bis(dimethylaminopropyl) urea, dimethylpiperazine, 1,2-dimethylimidazole, 1-aza-bicyclo[3.3.0]octane and preferably 1,4-diaza-bicyclo[2.2.2]octane and alkanolamine compounds such as triethanolamine, triisopropanolamine, N-methyl- and N-ethyldiethanolamine and dimethylethanolamine.

Suitable catalysts include tris-(dialkylamino)-s-hexahydrotriazines, especially tris(N,N-dimethylaminopropyl)-s-hexahydrotriazine, tetraalkylammonium hydroxides such as tetramethylammonium hydroxide, alkali hydroxides such as sodium hydroxide and alkali alcoholates such as sodium methylate and potassium isopropylate as well as alkali salts of long-chain fatty acids with 10 to 20 carbons and optionally OH pendent groups. 0.001 to 5 weight percent, especially 0.05 to 2 weight percent, of catalyst or catalyst combination, based on the weight of component (b) is preferred.

f) Optionally other additives and/or auxiliaries (f) may be incorporated into the reaction mixture to produce the polyurethane rigid foam. Examples include surface active substances, foam stabilizers, cell regulators, fillers, dyes, pigments, flame retardants, hydrolysis preventing agents, fungistatic and bacteriostatic agents.

Examples of surface active substances include compounds that support the homogenization of the starting materials and are optionally also suitable for regulating cell structure. Examples include emulsifiers such as the sodium salts of castor oil sulfates or of fatty acids as well as salts of fatty acids with amines, e.g., diethanolamine oleate, diethanolamine stearate, diethanolamine ricinoleate, salts of sulfonic acids, e.g., alkali or ammonium salts of dodecylbenzenesulfonic acid or dinaphthylmethanedisulfonic acid and ricinoleic acid; foam stabilizers such as siloxaneoxalkylene mixed copolymers and other organopolysiloxanes, oxethylated alkylphenols, oxethylated fatty alcohols, paraffin oils, castor oil and ricinoleic acid esters, Turkey red oil and peanut oil; as well as cell regulators such as paraffins, fatty alcohols and dimethyl polysiloxanes. Furthermore, the oligomeric acrylates with polyoxyalkylene and fluoroalkane side groups are also suitable for improving the emulsifying effect, the cell structure and/or for stabilizing the foam. These surface-active substances are generally used in amounts of 0.01 to 5 parts by weight based on 100 parts by weight of component (b).

Fillers, especially reinforcing fillers, are understood to refer to the known conventional organic and inorganic fillers, reinforcing agents, weighting agents, agents to improve abrasion properties in paints, coatings agents, etc. Specific examples include inorganic fillers, such as silicate minerals, such as layered silicates; e.g. antigorite, serpentine, hornblends, amphiboles, chrysotile, talc; metal oxides such as kaolin, aluminum oxides, aluminum silicate, titanium oxides and iron oxides, metal salts such as chalk, heavy spar; and inorganic pigments such as cadmium sulfide, zinc sulfide as well as glass particles. Examples of organic fillers include carbon black, melamine, colophony, cyclopentadienyl resins and graft polymers.

The organic and inorganic fillers may be used individually or as mixtures and are advantageously incorporated into the reaction mixture in amounts of 0.5 to 50 weight percent, preferably 1 to 40 weight percent, based on the weight of components (a) to (c).

Suitable flame retardants include, for example, tricresyl phosphate, tris-(2-chloroethyl)-phosphate, tris-(2-chloropropyl)phosphate, tris-(2,3-dibromopropyl)-phosphate, tris(1,3-dichloropropyl)phosphate and tetrakis-(2-chloroethyl)-ethylene diphosphate.

In addition to the aforementioned halogen substituted phosphates, inorganic flame retardants may also be used such as red phosphorus, aluminum hydroxide, antimony trioxide, arsenic oxide, aluminum polyphosphate and calcium sulfate; or cyanuric acid derivatives such as melamine or mixtures of at least two flame retardants, such as for example, ammonium polyphosphates and melamine, plus optionally starches for making the PU rigid foam of the present invention flame resistant. In general, it has proven advantageous to use 5 to 50 parts by weight, preferably 5 to 25 parts by weight, of the aforementioned flame retardants or mixtures thereof for each 100 parts by weight of components (a) through (c).

Details regarding the aforementioned other conventional additives and auxiliaries can be obtained from the technical literature, e.g., the monograph by J. H. Sauders and K. C. Frisch "High Polymers," volume XVI, *Polyurethanes*, parts 1 and 2, Interscience Publishers, 1962 and 1964, or in the *Plastics Handbook, Polyurethanes*, volume VII, Carl Hanser Publishers, Munich, Vienna, 1st and 2nd editions, 1966 and 1983.

To prepare the polyurethane rigid foam, the organic, optionally modified polyisocyanates (a), the higher molecular compounds (b) having at least 2 reactive hydrogen atoms, and optionally the chain extending agents and/or crosslinking agents (c) are reacted in such quantities so that the equivalent ratio of NCO groups from the polyisocyanates (a) to the total of the reactive hydrogen atoms of the (b) components and optionally (c) is from 0.85 to 1.25:1 more preferably 0.95 to 1.15:1 and, most preferably approximately 1.0 to 1.10:1. If the urethane group containing foams are modified by the formation of isocyanurate groups, for example, to increase flame resistance, then typically one employs a ratio of the NCO groups from polyisocyanates (a) to the total of the reactive hydrogen atoms of components (b) and optionally (c) of 1.5 to 10:1, more preferably 1.5 to 6:1.

The PU rigid foams can be prepared batchwise or continuously according to the prepolymer process or more preferably according to the one-shot process with the help of conventional mixing equipment.

It is proven especially advantageous to work according to the 2-component process and to incorporate starting components (b), (d), (e) and optionally (c) and (f) into the (A) component and to use the organic polyisocyanates, modified polyisocyanates (a) or mixtures of the aforesaid polyisocyanates and optionally blowing agent (d) as the (B) component.

The starting components are mixed at a temperature of 15 to 90° C., more preferably 20 to 35° C. and introduced into an open, optionally heated mold where the reaction mixture is allowed to foam essentially pressure free to avoid a compressed peripheral zone. To form composite elements, typically the backside of a top layer is coated, for example, by applying a coating or spraying, with a foamable reaction mixture then this is allowed to foam and cure into PU rigid foam.

The PU rigid foams prepared according to the present invention preferably have densities from 20 to 50 g/l and possess a thermal conductivity of 0.020 to 0.024 W/m·°K.

The PU rigid foams are preferably used as insulating intermediate layers in composite elements and to foam hollow spaces in low temperature compartment housings, especially for refrigerators and deep chest freezers and said foams are used as exterior shells for hot water storage tanks. Products are also suitable to insulate heated materials or as motor coverings and as pipe shells.

EXAMPLE 1

Preparation of the Polyurethane Rigid Foam

A Component:
A mixture comprising:

82.4 parts by weight of a polyether polyol having a hydroxyl number of 400 prepared by the anionic addition polymerization of 1,2-propylene oxide on sucrose,
3.6 parts by weight of water,
2.3 parts by weight of N,N-dimethylcyclohexylamine
0.8 parts by weight of a foam stabilizer based on a silicone (Tegostab ® B 8409 from Goldschmitt AG, Essen, FRG), and
10.9 parts by weight of cyclopentane.

B Component:
A mixture of diphenylmethane diisocyanates and polyphenyl polymethylene polyisocyanates (polymeric MDI, NCO content 31 weight percent).

100 parts by weight of the A component and 148 parts by weight of the B component were intensively mixed at 23° C. using a high speed stirrer at 2000 rpm, then the reaction mixture was poured into an open carton whose internal dimensions were 20×20×20 cm and it was allowed to foam.

Obtained was a uniform PU rigid foam having an average cell diameter of 300 microns, a thermal conductivity measured at 10° C. of 0.021 W/m·°K. and having a density of 22 g/l.

EXAMPLE 2

A Component:
A mixture comprising:

80.8 parts by weight of a polyether polyol having a hydroxyl number of 400 prepared by the anionic addition polymerization of 1,2-propylene oxide on sucrose,
2.0 parts by weight of water,
2.3 parts by weight of N,N-dimethylcyclohexylamine,
0.8 parts by weight of a foam stabilizer based on a silicone (Tegostab ® B 8409), and
14.1 parts by weight of a blowing agent mixture having a boiling point of approximately 25° C. comprising 13.5 parts by weight of cyclohexane and 0.6 parts by weight of heptafluoropropane.

B Component: Analogous to Example 1

100 parts by weight of the A component and 119 parts by weight of the B component are reacted analogous to the teachings of example 1.

Obtained was a PU rigid foam having a density of 21 g/l and a thermal conductivity measured at 10° C. of 0.023 W/m·°K.

EXAMPLE 3

A Component:
A mixture comprising, 81.4 parts by weight of a polyether polyol having a hydroxyl number of 400 prepared by the anionic addition polymerization of 1,2-propylene oxide and sucrose,
3.5 parts by weight of water,
2.3 parts by weight of N,N-dimethylcyclohexylamine
0.8 parts by weight of a foam stabilizer based on -continued silicone (Tegostab ® B 8409), and
12.0 parts by weight of a blowing agent mixture comprising 8 parts by weight of cyclopentane and 4 parts by weight of diethylether.

B Component: analogous to example 1.

100 parts by weight of the A component and 145 parts by weight of the B component were reacted analogous to the teachings of example 1. Obtained was PU rigid foam having a density of 23 g/l and a thermal conductivity measured at 10° C. of 0.022 W/m·°K.

EXAMPLE 4

A Component:
A mixture comprising:

82.9 parts by weight of a polyether polyol having a hydroxyl number 400 prepared by the anionic addition polymerization of 1,2-propylene oxide on sucrose,
3.0 parts by weight of water,
2.3 parts by weight of N,N-dimethylcyclohexylamine,
0.8 parts by weight of a foam stabilizer based on silicone (Tegostab ® B8409), and
11.0 parts by weight of a blowing agent mixture comprising 8 parts by weight cyclopentane and 3 parts by weight isobutane.

B Component: Analogous to example 1.

100 parts by weight of the A component and 138 parts by weight of the B component were reacted analogous to the teachings of example 1. Obtained was PU rigid foam having a density of 24 g/l and a thermal conductivity of 0.024 W/m·°K.

EXAMPLE 5

A Component:
A mixture comprising:

79.1 parts by weight of a polyether polyol having a hydroxyl number of 400 prepared by the anionic addition polymerization of 1,2-propylene oxide on sucrose,
1.8 parts by weight of water,
2.3 parts by weight of N,N-dimethylcyclohexylamine,
0.8 parts by weight of a foam stabilizer based on silicone (Tegostab ® B 8409), and
16.0 parts by weight of a blowing agent mixture comprising 15 parts by weight of cyclohexane and 1 part by weight of tetrafluoroethane.

B Component: Analogous to Example 1.

100 parts by weight of the A component and 114 parts by weight of the B component were reacted analogous to the teachings of example 1. Obtained was PU rigid foam having a density of 24 g/l and a thermal conductivity measured at 10° C. of 0.022 W/m·°K.

We claim:

1. A process for the preparation of polyurethane rigid foams having a low thermal conductivity, comprising reacting:
   a) organic and/or modified organic polyisocyanates with:
   b) at least one higher molecular weight compound having at least two reactive hydrogen atoms, and optionally;
   c) lower molecular weight, chain extending agents, and/or crosslinking agents;

in the presence of:
   d) blowing agents;
   e) catalysts and optionally;
   f) auxiliaries and/or additives;
wherein;
   d1) cyclopentane; or,
   d2) mixtures comprising:
      d2i) cyclopentane, cyclohexane, or a mixture of these cycloalkanes; and,
      d2ii) low boiling point compounds, homogeneously miscible with cyclopentane and/or cyclohexane
are used in conjunction with water as said blowing agent (d).

2. The process of claim 1 wherein said mixture d2) comprises:
   d2i) cyclopentane, cyclohexane, or a mixture of cycloalkanes; and,
   d2ii) compounds having a boiling point less than 35° C., homogeneously miscible with cyclopentane and/or cyclohexane, selected from the group consisting of; alkanes, cycloalkanes having a maximum of 4 carbon atoms, dialkyl ethers, cycloalkylene ethers, fluoroalkanes, and mixtures of at least two of the aforesaid compounds.

3. The process of claim 2 wherein said cyclopentane (d1) or said blowing agent mixture (d2) is used in conjunction with water.

4. The process of claim 1 wherein said blowing (d2) has a boiling point less than 30° C.

5. The process of claim 2 wherein said blowing agent mixture (d2) has a boiling point less than 30° C.

6. The process of claim 1 wherein:
   d1) cyclopentane; or,
   d2) a mixture comprising:
      d2i) cyclopentane, cyclohexane, or a mixture of these cycloalkanes;
      d2ii) at least one compound selected from the group consisting of n-butane, isobutane, cyclobutane, dimethyl ether, diethyl ether, furan, trifluoromethane, difluoromethane, difluoroethane, tetrafluoroethane, and heptafluoropropane;
are used as said blowing agent (d) in conjunction with water.

7. The process of claim 1 wherein;
   d1) 3 to 22 parts by weight of cyclopentane combined with from 0 to 7 parts by weight of water,
is used as said blowing agent (d) per 100 parts by weight of starting component (b).

8. The process of claim 1 wherein;
   d2i) 2 to 22 parts by weight of cyclopentane and/or cyclohexane;
   d2ii) 0.1 to 18 parts by weight of at least one compound having a boiling point less than 35° C. homogeneously miscible with cyclopentane and/or cyclohexane, selected from the group consisting of alkanes, cycloalkanes having a maximum of 4 carbon atoms, dialkyl ethers cycloalkylene ethers, and fluoroalkanes combined with from 0 to 7 parts by weight of water;
are used as said blowing agent (d) per 100 parts by weight of starting component.

9. The process of claim 1 wherein a mixture of diphenylmethane diisocyanates and polyphenyl polymethylene polyisocyanate having a diphenylmethane diisocyanate isomeric content of from 30 to 80 weight percent are used said organic polyisocyanate (a).

10. The process of claim 2 wherein a mixture of diphenylmethane diisocyanates and polyphenyl polymethylene polyisocyanate having a diphenylmethane diisocyanate isomeric content of from 30 to 80 weight percent are used said organic polyisocyanate (a).

11. The process of claim 1 wherein a mixture of diphenylmethane diisocyanates and polyphenyl polymethylene polyisocyanate having a diphenylmethane diisocyanate isomeric content of from 30 to 80 weight percent are used said organic polyisocyanate (a).

12. The process of claim 3 wherein a mixture of diphenylmethane diisocyanates and polyphenyl polymethylene polyisocyanate having a diphenylmethane diisocyanate isomeric content of from 30 to 80 weight percent are used said organic polyisocyanate (a).

13. The process of claim 4 wherein a mixture of diphenylmethane diisocyanates and polyphenyl polymethylene polyisocyanate having a diphenylmethane diisocyanate isomeric content of from 30 to 80 weight percent are used said organic polyisocyanate (a).

14. The process of claim 5 wherein a mixture of diphenylmethane diisocyanates and polyphenyl polymethylene polyisocyanate having a diphenylmethane diisocyanate isomeric content of from 30 to 80 weight percent are used said organic polyisocyanate (a).

15. The process of claim 6 wherein a mixture of diphenylmethane diisocyanates and polyphenyl polymethylene polyisocyanate having a diphenylmethane diisocyanate isomeric content of from 30 to 80 weight percent are used said organic polyisocyanate (a).

16. The process of claim 1 wherein at least one polyhydroxyl compound having a functionality of from 2 to 8 and a hydroxyl number of from 150 to 850 is used as said higher molecular weight compounds (b).

17. The process of claim 2 wherein at least one polyhydroxyl compound having a functionality of from 2 to 8 and a hydroxyl number of from 150 to 850 is used as said higher molecular weight compounds (b).

18. The process of claim 1 wherein at least one polyhydroxyl compound having a functionality of from 2 to 8 and a hydroxyl number of from 150 to 850 is used as said higher molecular weight compounds (b).

19. The process of claim 3 wherein at least one polyhydroxyl compound having a functionality of from 2 to 8 and a hydroxyl number of from 150 to 850 is used as said higher molecular weight compounds (b).

20. The process of claim 4 wherein at least one polyhydroxyl compound having a functionality of from 2 to 8 and a hydroxyl number of from 150 to 850 is used as said higher molecular weight compounds (b).

21. The process of claim 5 wherein at least one polyhydroxyl compound having a functionality of from 2 to 8 and a hydroxyl number of from 150 to 850 is used as said higher molecular weight compounds (b).

22. The process of claim 6 wherein at least one polyhydroxyl compound having a functionality of from 2 to 8 and a hydroxyl number of from 150 to 850 is used as said higher molecular weight compounds (b).

23. The process of claim 7 wherein at least one polyhydroxyl compound having a functionality of from 2 to 8 and a hydroxyl number of from 150 to 850 is used as said higher molecular weight compounds (b).

24. The polyurethane rigid foams prepared according to the process of claim 1.

25. The polyurethane rigid foams prepared according to the process of claim 2.

26. The polyurethane rigid foams prepared according to the process of claim 3.

27. The polyurethane rigid foams prepared according to the process of claim 4.

28. The polyurethane rigid foams prepared according to the process of claim 5.

29. The polyurethane rigid foams prepared according to the process of claim 6.

30. The polyurethane rigid foams prepared according to the process of claim 7.

31. The polyurethane rigid foams prepared according to the process of claim 8.

32. A process for the preparation of polyurethane rigid foams having a thermal conductivity of 0.02 to 0.024 W/M·°K. consisting essentially of reacting:
   a) organic and/or modified organic polyisocyanates with:
   b) lower molecular weight compound having at least two reactive hydrogen atoms, and optionally;
   c) lower molecular weight, chain extending agents, and/or crosslinking agents;
in the presence of:
   d) blowing agents;
   e) catalysts and optionally
   f) fillers, flame retardants, dyes, pigments, hydrolysis preventing agents, cell regulators, and/or foam stabilizers selected from the group consisting of organopolysiloxanes, siloxaneoxyalkylene mixed polymers, oxyethylated alkylphenols, oxyethylated fatty alcohols, paraffin oils, castor oil, ricinoleic acid esters, Turkey red oil, and peanut oil; wherein;
   d1) cyclopentane; or,
   d2) mixtures comprising:
      d2i) cyclopentane, cyclohexane, or a mixture of these cycloalkanes; and
      d2ii) compounds having a boiling point less than 35° C., homogeneously miscible with cyclopentane and/or cyclohexane
are used as said blowing agent (d).

* * * * *

UNITED STATES PATENT AND TRADEMARK OFFICE
CERTIFICATE OF CORRECTION

PATENT NO. : 5,096,933
DATED     : March 17, 1992
INVENTOR(S) : Otto Volkert

It is certified that error appears in the above-identified patent and that said Letters Patent is hereby corrected as shown below:

```
Column 16, (claim 32) lines 32 and 33,
Claim 32 b) should read as follows:

b) at least one higher molecular weight compound having at least two reactive hydrogen atoms, and optionally;
```

Signed and Sealed this

Twenty-fifth Day of May, 1993

Attest:

MICHAEL K. KIRK

*Attesting Officer*    *Acting Commissioner of Patents and Trademarks*

REEXAMINATION CERTIFICATE (2824th)
United States Patent [19]
Volkert

[11] B1 5,096,933
[45] Certificate Issued  Mar. 26, 1996

[54] PROCESS FOR THE PREPARATION OF POLYURETHANE RIGID FOAMS HAVING A LOW THERMAL CONDUCTIVITY AND THEIR USE

[75] Inventor: Otto Volkert, Weisenheim, Germany

[73] Assignee: BASF Aktiengesellschaft, Ludwigshafen, Germany

Reexamination Request:
No. 90/003,558, Aug. 30, 1994

Reexamination Certificate for:
Patent No.: 5,096,933
Issued: Mar. 17, 1992
Appl. No.: 577,174
Filed: Sep. 4, 1990

Certificate of Correction issued May 25, 1993.

[30] Foreign Application Priority Data

Oct. 6, 1989 [DE] Germany ................................ 3933335

[51] Int. Cl.$^6$ .................. C08K 5/00; C11D 7/30; C08G 18/14
[52] U.S. Cl. .................. 521/131; 521/98; 521/99; 521/114; 521/115; 521/137; 521/160; 521/172
[58] Field of Search ............................. 521/131, 98, 99, 521/114, 115, 137, 160, 172

[56] References Cited

U.S. PATENT DOCUMENTS

| | | |
|---|---|---|
| 3,558,531 | 1/1971 | Salyer et al. . |
| 3,586,651 | 6/1971 | Salyer et al. . |
| 3,674,717 | 7/1972 | Fuzesi et al. . |
| 3,694,385 | 9/1972 | Salyer et al. . |
| 3,745,203 | 7/1973 | Harper . |
| 3,853,685 | 12/1974 | Friedrich et al. . |
| 4,110,274 | 8/1978 | Corbett et al. . |
| 4,139,501 | 2/1979 | Rudner et al. . |
| 4,334,944 | 6/1982 | Creyf . |
| 4,404,294 | 9/1983 | Wiedermann . |
| 4,451,587 | 5/1984 | Keshi et al. . |
| 4,555,442 | 11/1985 | Frentzel . |
| 4,572,919 | 2/1986 | Londrigan . |
| 4,575,520 | 3/1986 | Kapps et al. . |
| 4,623,672 | 11/1986 | Kleinstuck et al. . |
| 4,795,763 | 1/1989 | Gluck et al. . |
| 4,898,893 | 2/1990 | Ashida . |
| 4,972,003 | 11/1990 | Grünbauer et al. . |
| 4,981,879 | 1/1991 | Snider . |
| 4,996,242 | 2/1991 | Lin . |
| 4,997,589 | 3/1991 | Lund et al. . |
| 4,997,706 | 3/1991 | Smits et al. . |
| 5,031,424 | 7/1991 | Wenning et al. . |
| 5,096,933 | 3/1992 | Volkert . |
| 5,214,076 | 5/1993 | Tideswell et al. . |
| 5,318,997 | 6/1994 | Okada et al. . |

FOREIGN PATENT DOCUMENTS

| | | |
|---|---|---|
| 389011A1 | 9/1990 | European Pat. Off. . |
| 405439A2 | 1/1991 | European Pat. Off. . |
| 876977 | 9/1961 | United Kingdom . |

OTHER PUBLICATIONS

Proc. Roy. Soc. (London), vol. A 231, 1955, pp. 280–295, J. D. Lambert et al. "Transport Properties of Gaseous Hydrocarbons".

ESDV Engineering Sciences Data, "Thermal Conductivity of Gaseous Aliphatic Hydrocarbons", Part 1, *Alkanes*, Oct. 1985, ESDV International plc, 89035.

ESDV Engineering Sciences Data, "Thermal Conductivity of Miscellaneous Gaseous Hydrocarbons" Nov. 1991, 91030, p. 51.

Vorläufiges Merkblatt der Bayer A6 vom Aug. 1982 Baytherm® Trial Product PU 1295 A/3.

Encyclopedia of Polymer Science and Technology, John Wiley A. Sons, vol. 2, pp. 532–565 (1965).

WPAT Abstract (English Language) of DE-3,509,959.

Vorläufiges Merkblatt der Bayer A6 vom Nov. 1980, Baytherm Versuchsprodukt PU 1230 A/0, –A/2, –A/235.

Vorlaufiges Merkblatt der Bayer A6 vom Jan. 1985, Baytherm Trial Product PU 1371 A/0.

Lohmeyer, S. "Prufmethoden fur PUR–Roh–und Shaumstoffe in der Kälteindustrie," Kunststoffe—Bd 64, pp. 446–451 (1974).

*Primary Examiner*—James J. Seidleck

[57] ABSTRACT

The present invention relates to a process for the preparation of polyurethane rigid foams having a low thermal conductivity, comprising reacting:

a) organic and/or modified organic polyisocyanates with,
b) at least one higher molecular weight compound having at least two reactive hydrogen atoms, and optionally
c) lower molecular weight chain extending agents and/or crosslinking agents in the presence of,
d) cyclopentane (d1) or mixtures (d2) comprising, d2i) cyclopentane, and/or cyclohexane, d2ii) at least one compound homogeneously miscible with cyclopentane and/or cyclohexane, said compound preferably has a boiling point below 35° C. and is selected from the group consisting of alkanes, cycloalkanes having a maximum of 4 carbon atoms, dialkylethers, cycloalkylene ethers and fluoroalkanes, optionally combined with water as said blowing agent (d),
e) catalysts, and optionally
f) auxiliaries and/or additives.

Polyurethane rigid foams are used in the low temperature appliance industry and as insulating materials in heating and composite elements.

B1 5,096,933

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 12, 19 and 26 are cancelled.

Claims 1, 4, 8 and 32 are determined to be patentable as amended.

Claims 2, 5–7, 9–11, 13–18, 20–25 and 27–31, dependent on an amended claim, are determined to be patentable.

New claims 33–58 are added and determined to be patentable.

1. A process for the preparation of polyurethane rigid foams [having a low thermal conductivity], comprising reacting:

a) organic and/or modified organic polyisocyanates with:

b) at least one higher molecular weight compound having at least two reactive hydrogen atoms, and optionally;

c) lower molecular weight, chain extending agents, and/or crosslinking agents;

in the presence of:

d) blowing agents;

e) catalysts and optionally;

auxiliaries and/or additives;

*to produce a closed-cell rigid polyurethane foam having a thermal conductivity of 0.024 W/m°K. or less, wherein;* d1) cyclopentane; or d2) mixtures comprising:

d2i) cyclopentane, cyclohexane, or a mixture of these cycloalkanes; and, d2ii) low boiling point compounds, homogeneously miscible with cyclopentane and/or cyclohexane are used in conjunction with water as said blowing agent (d).

4. The process of claim 1 wherein said blowing *agent mixture* (d2) has a boiling point less than 30° C.

8. The process of claim 1 wherein:

d2i) 2 to 22 parts by weight of cyclopentane and/or cyclohexane;

d2ii) 0.1 to 18 parts by weight of at least one compound having a boiling point of less that 35° C. homogeneously miscible with cyclopentane and/or cyclohexane, selected from the group consisting of alkanes, cycloalkanes having a maximum of 4 carbon atoms, dialkyl ethers cycloalkylene ethers, and fluoroalkanes combined with from 0 to 7 parts by weight of water;

are used as said blowing agent (d) per 100 parts by weight of starting component (b).

32. A process for the preparation of polyurethane rigid foams having a thermal conductivity of 0.02 to 0.024 W/M°K. consisting essentially of reacting:

a) organic and/or modified organic polyisocyanates with:

b) at least one higher molecular weight compound having at least two reactive hydrogen atoms, and optionally;

c) lower molecular weight, chain extending agents, and/or crosslinking agents;

in the presence of:

d) blowing agents;

e) catalysts and optionally;

f) fillers, flame retardants, dyes, pigments, hydrolysis preventing agents, cell regulators, and/or foam stabilizers selected from the group consisting of organopolysiloxanes, siloxaneoxyalkylene mixed polymers, oxyethylated alkylphenols, oxyethylated fatty alcohols, paraffin oils, castor oil, ricinoleic acid esters, Turkey red oil, and peanut oil;

*to produce a closed cell rigid polyurethane foam, wherein;* d1) cyclopentane; or d2) mixtures comprising:

d2i) cyclopentane, cyclohexane, or a mixture of these cycloalkanes; and, d2ii) compounds having a boiling point less than 35° C., homogeneously miscible with cyclopentane and/ or cyclohexane;

are used *in conjunction with water* as said blowing agent (d).

*33. The process of claim 1, wherein any additional blowing agents d) added to water, and cyclopentane and/or cyclohexane, have a boiling point of less than 35° C.*

*34. The process of claim 1, wherein the blowing agents d) comprise water and cyclopentane.*

*35. A process for the preparation of polyurethane rigid foams, comprising reacting:*

*a) organic and/or modified organic polyisocyanates with:*

*b) at least one higher molecular weight compound having at least two reactive hydrogen atoms, and optionally;*

*c) lower molecular weight, chain extendings, and/or crosslinking agents;*

*in the presence of:*

*d) blowing agents; and*

*e) catalyst:*

*to produce a closed cell rigid polyurethane foam, wherein said blowing agents d) comprise water and*

*d1) cyclopentane; or*

*d2) mixtures comprising:*

*d2i) cyclopentane, cyclohexane, or a mixture of these cycloalkanes; and,*

*d2ii) low boiling point compounds, homogeneously miscible with cyclopentane and/or cyclohexane; provided that all blowing agents other than cyclopentane, cyclohexane, and water are selected from the group consisting of alkanes, cycloalkanes, dialkylethers, cycloalkylene ethers, and fluoroalkanes.*

*36. The process of claim 35, wherein the blowing agents d) comprise water and cyclopentane.*

*37. The process of claim 35, wherein the blowing agents d) comprise water, cyclopentane, and a blowing agent selected from the group consisting of alkanes, cycloalkanes, dialkylethers, cycloalkylene ethers, and fluoroalkanes.*

*38. The process of claim 35, wherein the blowing agents d) comprise water, cyclohexane, and a blowing agent selected from the group consisting of alkanes, cycloalkanes, dialkylethers, cycloalkylene ethers, and fluoroalkanes.*

*39. The process of claim 35, wherein the blowing agents d) comprise water, cyclopentane, cyclohexane, and a blowing agent selected from the group consisting of alkanes, cycloalkanes, dialkylethers, cycloalkylene ethers, and fluoroalkanes.*

40. The process of claim 35, wherein the foam has a thermal conductivity of 0.024 W/m°K. or less.

41. The process of claim 35, wherein said additional blowing agents selected from the group consisting of alkanes, cycloalkanes, dialkylethers, cycloalkylene ethers, and fluoroalkanes, having a boiling point of less than 35° C.

42. The process of claim 35, wherein said blowing agent mixtures (d2) has a boiling point of less than 30° C.

43. The process of claim 35, wherein said blowing agents d) comprise from 3 to 22 parts by weight of cyclopentane and greater than zero to 7 parts by weight of water, based on 100 parts by weight of starting component (b).

44. The process of claim 35, wherein said blowing agents d) comprise:

d2i) 2 to 22 parts by weight of cyclopentane and/or cyclohexane;

d2ii) 0.1 to 18 parts by weight of at least one compound having a boiling point of less than 35° C. homogeneously miscible with cyclopentane and/or cyclohexane, selected from the group consisting of alkanes, cycloalkanes, dialkylethers, cycloalkylene ethers, and fluoroalkanes;

and greater than zero to 7 parts by weight water; each based on 100 parts by weight of starting component (b).

45. The process of claim 35, wherein said organic polyisocyanate (a) comprises a mixture of diphenylmethane diisocyanates and polyphenylpolymethylene polyisocyanates having a diphenylmethane diisocyanate isomeric content of from 30 to 80 weight percent.

46. The process of claim 35, wherein said high molecular weight compounds (b) comprise a polyhydroxyl compound having a functionality of from 2 to 8 and a hydroxyl number of from 150 to 850.

47. A process for the preparation of polyurethane rigid foam, comprising reacting:

a) organic and/or modified organic polyisocyanates with;

b) at least one higher molecular weight compound having at least two reactive hydrogen atoms, and optionally;

c) lower molecular weight, chain extending agents, and/or crosslinking agents;

in the presence of:

d) blowing agents: and e) catalysts;

to produce a closed cell rigid polyurethane foam, wherein said blowing agent d) consist essentially of water and d1) cyclopentane; or d2) mixtures comprising:

d2i) cyclopentane, cyclohexane, or a mixture of these cycloalkanes; and d2ii) low boiling point compounds having a boiling point of less than 35° C., homogeneously miscible with cyclopentane and/or cyclohexane.

48. The process of claim 47, wherein the blowing agents d) consist essentially of water and cyclopentane.

49. The process of claim 47, wherein the blowing agents d) consist essentially of a mixture of water, cyclopentane, and said d2ii) low boiling point compounds.

50. The process of claim 47, wherein said foams have a thermal conductivity of 0.024 W/m°K. or less.

51. The process of claim 47, wherein said additional blowing agents selected from the group consisting of alkanes, cycloalkanes, dialkylethers, cycloalkylene ethers, and fluoroalkanes, have a boiling point of less than 35° C.

52. The process of claim 47, wherein said blowing agent mixtures (d2) has a boiling point of less than 30° C.

53. The process of claim 47, wherein said blowing agents d) comprise from 3 to 22 parts by weight of cyclopentane and greater than zero to 7 parts of water, based on 100 parts by weight of starting component (b).

54. The process of claim 48, wherein said blowing agents d) comprise:

d2i) 2 to 22 parts by weight of cyclopentane and/or cyclohexane;

d2ii) 0.1 to 18 parts by weight of at least one compound having a boiling point of less than 35° C. homogeneously miscible with cyclopentane and/or cyclohexane, selected from the group consisting of alkanes, cycloalkanes, dialkylethers, cycloalkylene ethers, and fluoroalkanes;

and greater than zero to 7 parts by weight water; each based on 100 parts by weight of starting component (b).

55. The process of claim 47, wherein said organic polyisocyanate (a) comprises a mixture of diphenylmethane diisocyanates and polyphenylpolymethylene polyisocyanates having a diphenylmethane diisocyanate isomeric content of from 30 to 80 weight percent.

56. The process of claim 47, wherein said high molecular weight compounds (b) comprise a polyhydroxyl compound having a functionality of from 2 to 8 and a hydroxyl number of from 150 to 850.

57. A process according to claim 1 wherein said blowing agents (d) consist of cyclopentane and water.

58. A process according to claim 32 wherein said blowing agents (d) consist of cyclopentane and water.

* * * * *